US010620732B2

(12) United States Patent
Oh et al.

(10) Patent No.: US 10,620,732 B2
(45) Date of Patent: Apr. 14, 2020

(54) TOUCH SCREEN PANEL WITH MESH PATTERN HAVING IMPROVED PERFORMANCE AND DISPLAY DEVICE INCLUDING THE SAME

(71) Applicant: LG DISPLAY CO., LTD., Seoul (KR)

(72) Inventors: ChangSeok Oh, Daegu (KR); Jonghyun Han, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/115,074

(22) Filed: Aug. 28, 2018

(65) Prior Publication Data

US 2019/0064980 A1    Feb. 28, 2019

(30) Foreign Application Priority Data

Aug. 28, 2017 (KR) .......................... 10-2017-0108958

(51) Int. Cl.
*G06F 3/044* (2006.01)
*G06F 3/041* (2006.01)

(52) U.S. Cl.
CPC ............ *G06F 3/0412* (2013.01); *G06F 3/044* (2013.01); *G06F 3/0416* (2013.01); *G06F 2203/04112* (2013.01)

(58) Field of Classification Search
CPC ............................................ G06F 2203/04112
See application file for complete search history.

(56) References Cited

U.S. PATENT DOCUMENTS

| 2013/0219679 | A1  | 8/2013  | Cok         |              |
|--------------|-----|---------|-------------|--------------|
| 2014/0152580 | A1  | 6/2014  | Weaver et al. |            |
| 2015/0015532 | A1  | 1/2015  | Choung et al. |            |
| 2016/0018932 | A1* | 1/2016  | Nakayama    | G06F 3/041   |
|              |     |         |             | 345/173      |
| 2016/0103620 | A1  | 4/2016  | Kim et al.  |              |
| 2016/0195983 | A1* | 7/2016  | Miyake      | G06F 3/0412  |
|              |     |         |             | 345/174      |
| 2017/0115818 | A1* | 4/2017  | Cai         | G06F 3/044   |
| 2017/0139516 | A1* | 5/2017  | Koike       | B32B 5/028   |
| 2017/0336907 | A1* | 11/2017 | Jeong       | G06F 3/0416  |
| 2018/0039360 | A1* | 2/2018  | Akimoto     | G06F 3/0412  |
| 2018/0059837 | A1* | 3/2018  | Kim         | G06F 3/0412  |
| 2018/0113345 | A1* | 4/2018  | Song        | G02F 1/13338 |
| 2018/0129329 | A1* | 5/2018  | Liu         | G02F 1/133514|
| 2018/0157359 | A1* | 6/2018  | Lin         | H01L 27/1222 |
| 2018/0190723 | A1  | 7/2018  | Han et al.  |              |

* cited by examiner

*Primary Examiner* — Sanghyuk Park

(74) *Attorney, Agent, or Firm* — Birch, Stewart, Kolasch & Birch, LLP

(57) ABSTRACT

A touch screen panel according to the present disclosure includes a plurality of touch sensors. Each of the touch sensors includes a first touch electrode unit extending in a first direction, and a second touch electrode unit extending in a second direction. The first touch electrode unit includes a plurality of first mesh pattern electrodes disposed to be spaced apart from each other in a sensing area where the first touch electrode unit and the second touch electrode unit intersect, and the second touch electrode unit includes a plurality of second mesh pattern electrodes disposed between the plurality of first mesh pattern electrodes to be spaced apart from each other in the sensing area. A redundant load in an area other than the sensing area of the touch screen panel is minimized so that a touch response speed of the touch screen panel can be improved.

18 Claims, 14 Drawing Sheets

TOUCH SCREEN PANEL WITH MESH PATTERN HAVING IMPROVED PERFORMANCE AND DISPLAY DEVICE INCLUDING THE SAME

CROSS-REFERENCE TO RELATED APPLICATIONS

This application claims the priority of Korean Patent Application No. 10-2017-0108958 filed on Aug. 28, 2017, in the Korean Intellectual Property Office, the disclosure of which is incorporated herein by reference into the present application.

BACKGROUND

Field

The present disclosure relates to a touch screen panel and a display device including the same, and more particularly, to a metal mesh type touch screen panel with an improved touch performance and a display device including the same.

Description of the Related Art

A touch screen panel is a device which uses a screen touch or a gesture of a user as input information and is mounted on personal portable electronic devices such as smartphones or tablet PCs to be widely used. The touch screen panel is mainly used to be disposed close to a device for displaying images such as a display panel, and users can generally input touches to the image displayed on the display panel.

Generally, the touch screen panel includes a touch sensing electrode for sensing a touch input of the user. A transparent electrode formed of a transparent conductive material, such as indium tin oxide (ITO), is used as the touch sensing electrode of the touch screen panel to allow the user to visibly recognize images disposed on the display panel.

Generally, ITO used for the touch sensing electrode of the touch screen panel has a lower flexibility than a metal material. Therefore, when the touch screen panel which uses ITO as a material of the touch sensing electrode is applied to a flexible display device, ITO can be cracked so that defects of the touch screen panel can cause problems. Further, since ITO has a higher sheet resistance than that of the metal material, when the touch screen panel which uses ITO as a material of the touch sensing electrode is applied to a large size display device, there can be a problem in the driving of the touch screen panel due to the high sheet resistance of ITO. Further, there is a problem in that a transmittance of a transparent conductive oxide such as ITO is low. Furthermore, since ITO is a rare material and is expensive to purchase, the manufacturing cost of the touch screen panel can also be expensive.

SUMMARY

The inventors of the present disclosure thus developed a novel metal mesh type touch screen panel for solving the problems and limitations of a general touch screen panel which uses ITO as a material for a touch sensing electrode. However, when the novel metal mesh type touch screen panel is applied to an electroluminescent display device, there may be a problem in that a touch sensitivity or a response speed may be lowered due to a parasitic capacitance between the display panel and the touch screen panel.

Therefore, the inventors of the present disclosure further developed a touch screen panel which can reduce an internal parasitic capacitance and an external parasitic capacitance to improve the response speed and a display device including the same.

Another object to be achieved by the present disclosure is to provide a touch screen panel which is attached to the display panel but does not deteriorate optical characteristics of the display device and a display device including the same.

Another object of the present disclosure is to provide a touch screen panel and a display having the touch screen panel, which address the limitations and disadvantages associated with the related art.

Objects of the present disclosure are not limited to the above-mentioned objects, and other objects, which are not mentioned above, can be clearly understood by those skilled in the art from the following descriptions.

According to an aspect of the present disclosure, a touch screen panel includes a plurality of touch sensors and each of the touch sensors includes a first touch electrode unit extending in a first direction, and a second touch electrode unit extending in a second direction. The first touch electrode unit includes a plurality of first mesh pattern electrodes disposed to be spaced apart from each other in a sensing area where the first touch electrode unit and the second touch electrode unit intersect. The second touch electrode unit includes a plurality of second mesh pattern electrodes disposed between the plurality of first mesh pattern electrodes to be spaced apart from each other in the sensing area.

According to another aspect of the present disclosure, a display device includes a display panel including a bank disposed on a substrate and a plurality of pixels defined by the bank, a touch screen panel including a plurality of touch sensors, and a touch driver which drives the touch screen panel. Each of the touch sensors includes a first touch electrode unit which is disposed on the bank and extends in a first direction, and a second touch electrode unit which is disposed on the bank and extends in a second direction. The first touch electrode unit includes a plurality of first mesh pattern electrodes disposed to be spaced apart from each other in a sensing area where the first touch electrode unit and the second touch electrode unit intersect, and the second touch electrode unit includes a plurality of second mesh pattern electrodes disposed between the plurality of first mesh pattern electrodes to be spaced apart from each other in the sensing area.

Other detailed matters of the embodiments are included in the detailed description and the drawings.

According to the aspect of the present disclosure, the touch screen panel forms a maximum mutual capacitance for sensing the touch by disposing a first touch electrode unit and a second touch electrode unit to intersect each other in a sensing area so that a redundant load can be minimized in an area other than the sensing area of the touch screen panel to improve a touch response speed of the touch screen panel.

Further, according to the aspect of the present disclosure, the display device including the touch screen panel can dispose a mesh type first touch electrode unit and a mesh type second touch electrode unit on a mesh type bank to improve the optical characteristics of the display panel.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENTS

Figure 1:
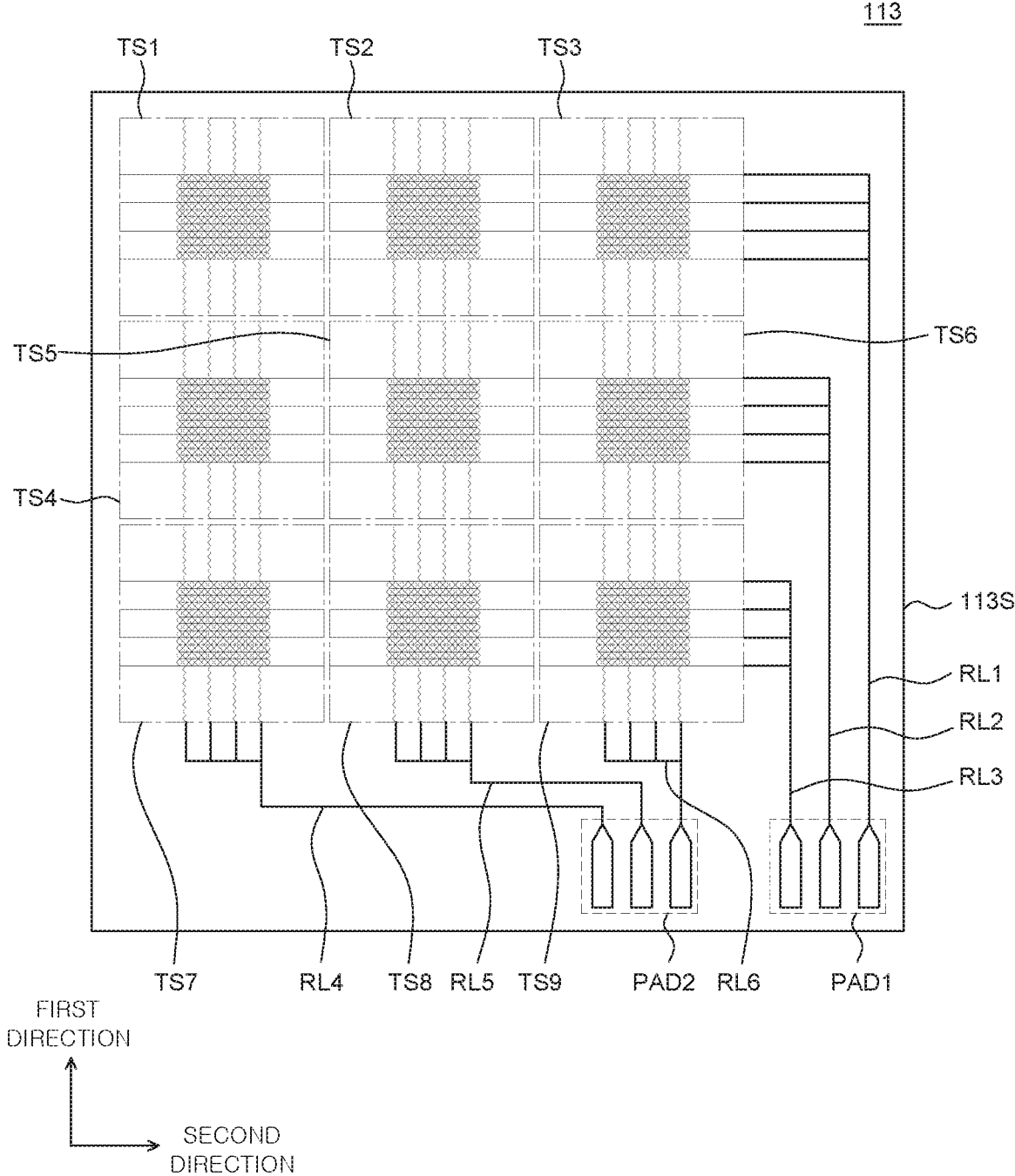
FIG. 1 is a view for explaining a touch screen panel according to an embodiment of the present disclosure.

Advantages and characteristics of the present disclosure and a method of achieving the advantages and characteristics will be clear by referring to various embodiments described below in detail together with the accompanying drawings. However, the present disclosure is not limited to the embodiments disclosed herein but will be implemented in various forms. The embodiments are provided by way of example only so that a person of ordinary skilled in the art can fully understand the disclosures of the present disclosure and the scope of the present disclosure. Therefore, the present disclosure will be defined only by the scope of the appended claims.

Further, in the following description, a detailed explanation of known related technologies can be omitted to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

Although the terms "first", "second", and the like are used for describing various components, these components are not confined by these terms. These terms are merely used for distinguishing one component from the other components. Therefore, a first component to be mentioned below can be a second component in a technical concept of the present disclosure.

Like reference numerals generally denote like elements throughout the specification.

The features of various embodiments of the present disclosure can be partially or entirely bonded to or combined with each other and can be interlocked and operated in technically various ways understood by those skilled in the art, and the embodiments can be carried out independently of or in association with each other.

Hereinafter, various embodiments of the present disclosure will be described in detail with reference to accompanying drawings.

FIG. 1 is a view for explaining a touch screen panel according to an embodiment of the present disclosure. All the components of the touch screen panel according to all embodiments of the present disclosure are operatively coupled and configured.

Referring to FIG. 1, a touch screen panel 113 according to an embodiment of the present disclosure includes a plurality of touch sensors TS1 to TS9 which are disposed on a substrate 113S in a matrix and sense a touch operation of a user, a plurality of pads PAD1 and PAD2 connected to an external touch driver, and a plurality of routing lines RL1 to RL6 which connect the plurality of touch sensors TS1 to TS9 and the plurality of pads PAD1 and PAD2.

Here, the substrate 113S can be formed of a transparent and/or flexible material. For example, the substrate 113S can be formed of plastic which is transparent and has a bendable property, such as polyethylene terephthalate (PET) or polyimide (PI).

The plurality of touch sensors TS1 to TS9 are connected to each other, and the plurality of connected touch sensors TS1 to TS9 are connected to the plurality of pads PAD1 and PAD2 through the plurality of routing lines RL1 to RL6. By doing this, each of the touch sensors TS1 to TS9 is applied with a touch signal for sensing a touch from the external touch driver to sense the touch.

For example, as illustrated in FIG. 1, the plurality of touch sensors TS1 to TS9 can be configured by first to ninth touch sensors TS1 to TS9 disposed in a 3×3 matrix. However, the arrangement of the plurality of touch sensors is not limited thereto, and can be expanded or modified in various ways.

Further, the first, fourth, and seventh touch sensors TS1, TS4, and TS7 disposed in a first direction are connected to the second pad PAD2 through the fourth routing line RL4. The second, fifth, and eighth sensors TS2, TS5, and TS8 disposed in the first direction are connected to the second pad PAD2 through the fifth routing line RL5. The third, sixth and ninth sensors TS3, TS6, and TS9 disposed in the first direction are connected to the second pad PAD2 through the sixth routing line RL6.

The first to third touch sensors TS1, TS2, and TS3 disposed in a second direction are connected to the first pad PAD1 through the first routing line RL1. The fourth to sixth sensors TS4, TS5, and TS6 disposed in the second direction are connected to the first pad PAD1 through the second routing line RL2. The seventh to ninth sensors TS7, TS8, and TS9 disposed in the second direction are connected to the first pad PAD1 through the third routing line RL3.

Here, different touch signals can be applied to the first pad PAD1 and the second pad PAD2 to drive the touch screen panel 113 in a mutual capacitive manner and the same touch signal can be applied to the first pad PAD1 and the second pad PAD2 to drive the touch screen panel 113 in a self-capacitive manner.

Figure 2A:
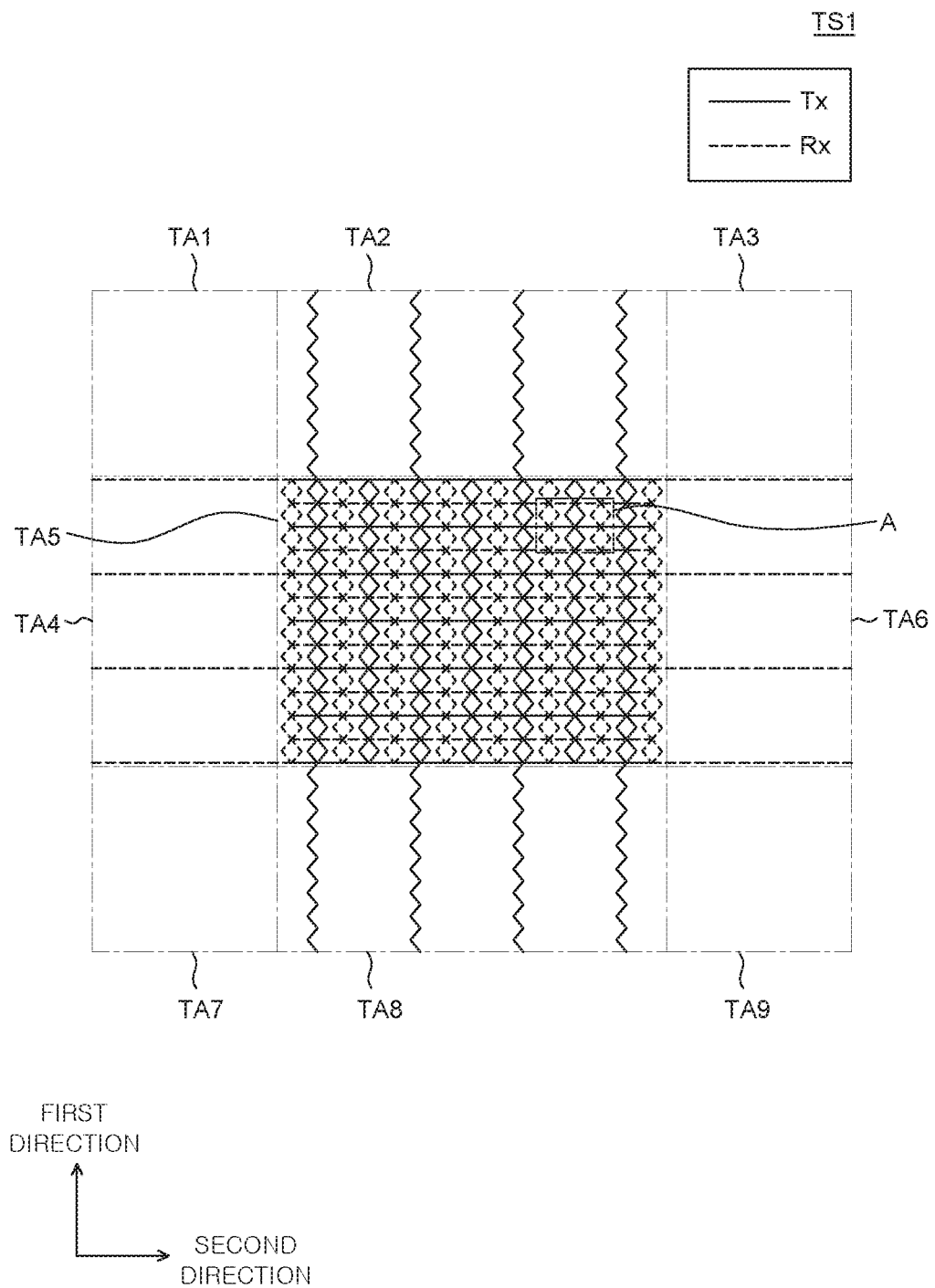
FIG. 2A is a view for explaining a touch sensor of a touch screen panel according to an embodiment of the present disclosure and FIG. 2B is a view for explaining a sensing area of a touch screen panel according to an embodiment of the present disclosure.
Figure 2B:
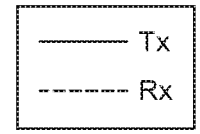
Figure 2B:
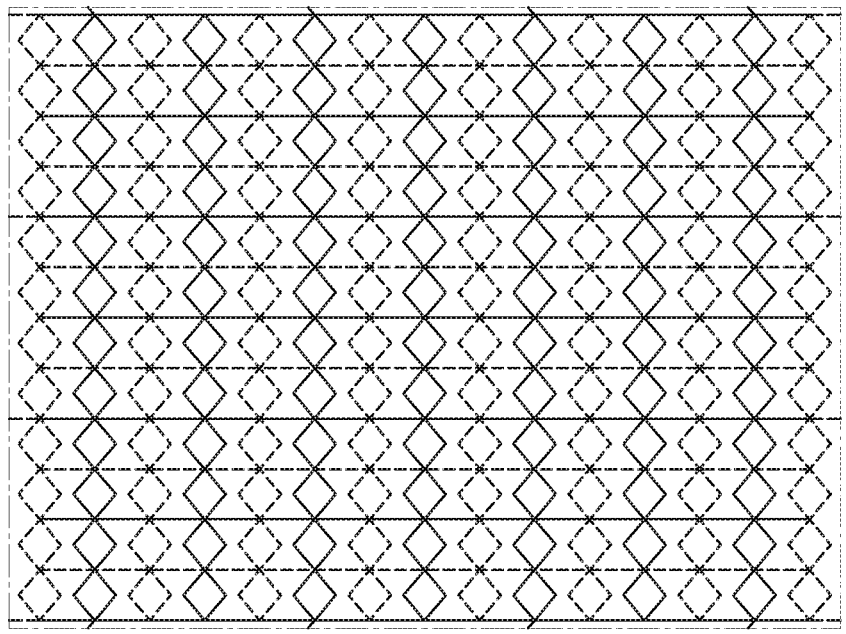
Figure 2B:
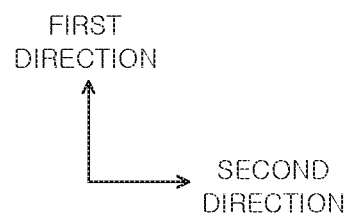

FIG. 2A is a view for explaining a touch sensor of the touch screen panel according to an embodiment of the present disclosure and FIG. 2B is a view for explaining a sensing area of the touch screen panel according to an embodiment of the present disclosure.

Specifically, FIG. 2A is a view for explaining a first touch electrode unit Tx and a second touch electrode unit Rx disposed in each of the touch sensors TS1 to TS9 of the touch screen panel 113.

In the example of FIG. 2A, the first touch sensor TS1 among the plurality of touch sensors TS1 to TS9 will be mainly described and the remaining touch sensors, that is, the second to ninth touch sensors TS2 to TS9 have the same or substantially the same structure as the first touch sensor TS1. However, the configuration and structure of the touch sensors are not limited thereto and a size and a design of each of the touch sensors at an outer periphery of the touch screen panel 113 can be partially modified. In FIG. 2A, the first touch electrode unit Tx is represented by a solid line and the second touch electrode unit Rx is represented by a dotted line.

As illustrated in FIG. 2A, the first touch sensor TS1 includes the first touch electrode unit Tx extending in a first direction and the second touch electrode unit Rx extending in a second direction. The first and second directions are perpendicular to each other or substantially perpendicular to each other.

The first touch electrode unit Tx is applied with a touch signal through the fourth routing line RL4 and the second touch electrode unit Rx is applied with a touch signal through the first routing line RL1. Here, the first touch electrode unit Tx and the second touch electrode unit Rx can transmit and receive different touch signals to drive the touch screen panel 113 in a mutual capacitive manner. Further, the first touch electrode unit Tx and the second touch electrode unit Rx can be applied with the same touch signal to drive the touch screen panel 113 in a self-capacitive manner.

Further, as illustrated in FIG. 2A, the first touch sensor TS1 can be divided into a plurality of touch areas, e.g., first to ninth touch areas TA1 to TA9, with respect to an arrangement relationship of the first touch electrode unit Tx and the second touch electrode unit Rx.

Specifically, an area where the first touch electrode unit Tx extending in the first direction and the second touch electrode Rx extending in the second direction intersect each other is defined as a fifth touch area TA5 or a sensing area disposed at a center portion of the first touch sensor TS1. Areas at the top, left, right and bottom of the fifth touch area TA5 are defined respectively as second, fourth, sixth, and eighth touch areas TA2, TA4, TA6, and TA8. Further, areas adjacent to the fifth touch areas TA5 in diagonal line directions are defined as first, third, seventh, and ninth touch areas TA1, TA3, TA7, and TA9.

That is, the first to third touch areas TA1 to TA3 are disposed in an upper portion of the first touch sensor TS1 in the second direction, the fourth to sixth touch areas TA4 to TA6 are disposed in the middle of the first touch sensor TS1 in the second direction, and the seventh to ninth touch areas TA7 to TA9 are disposed in a lower portion of the first touch sensor TS1 in the second direction.

By doing this, the first touch electrode unit Tx extending in the first direction can be disposed over the second, fifth, and eighth touch areas TA2, TA5, and TA8, and the second touch electrode unit Rx extending in the second direction can be disposed over the fourth, fifth, and sixth touch areas TA4, TA5, and TA6. In other words, the first touch electrode unit Tx can extend in the first direction at the center portion of the first touch sensor TS1. The second touch electrode unit Rx can extend in the second direction at the center portion of the first touch sensor TS1. Further, the first touch electrode unit Tx and the second touch electrode unit Rx can be configured to intersect each other at the center portion of the first touch sensor TS1.

As illustrated in FIG. 2B, the first touch electrode unit Tx disposed in the fifth touch area TA5 which is a sensing area can include a first mesh pattern, and the second touch electrode unit Rx disposed in the fifth touch area TA5 can include a second mesh pattern. In one example, rows of the first and second mesh patterns extending in the first direction are alternatingly disposed. Here, the touch operation of the user can be sensed by sensing a change in the mutual capacitance between the first mesh pattern and the second mesh pattern.

Hereinafter, the first touch electrode unit Tx and the second touch electrode unit Rx disposed in the first touch sensor TS1 will be described in detail with reference to FIGS. 3A to 4B.

Figure 3A:
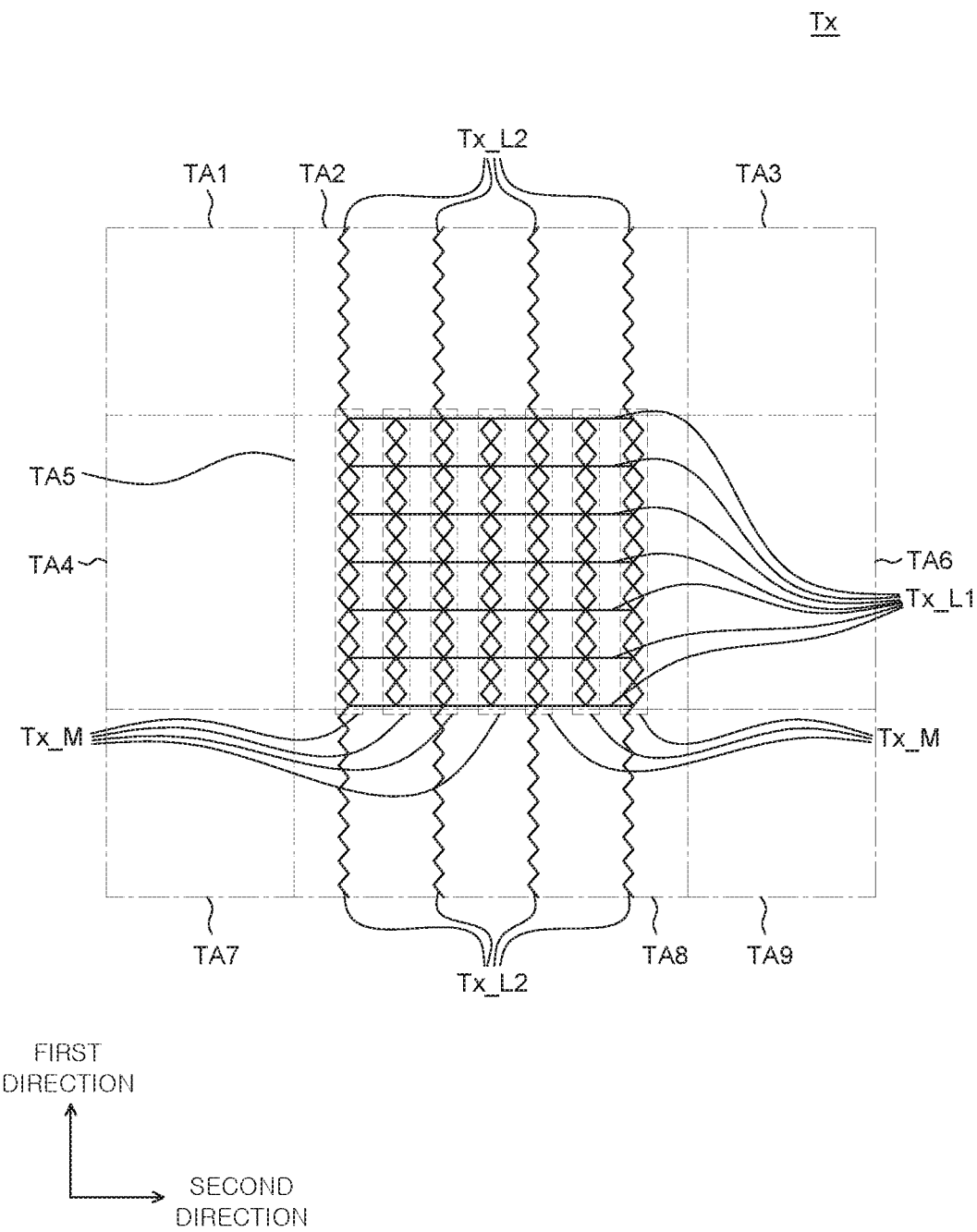
FIG. 3A is a view for explaining a first touch electrode unit of a touch screen panel according to an embodiment of the present disclosure and FIG. 3B is a view for explaining a second touch electrode unit of a touch screen panel according to an embodiment of the present disclosure.
Figure 3B:
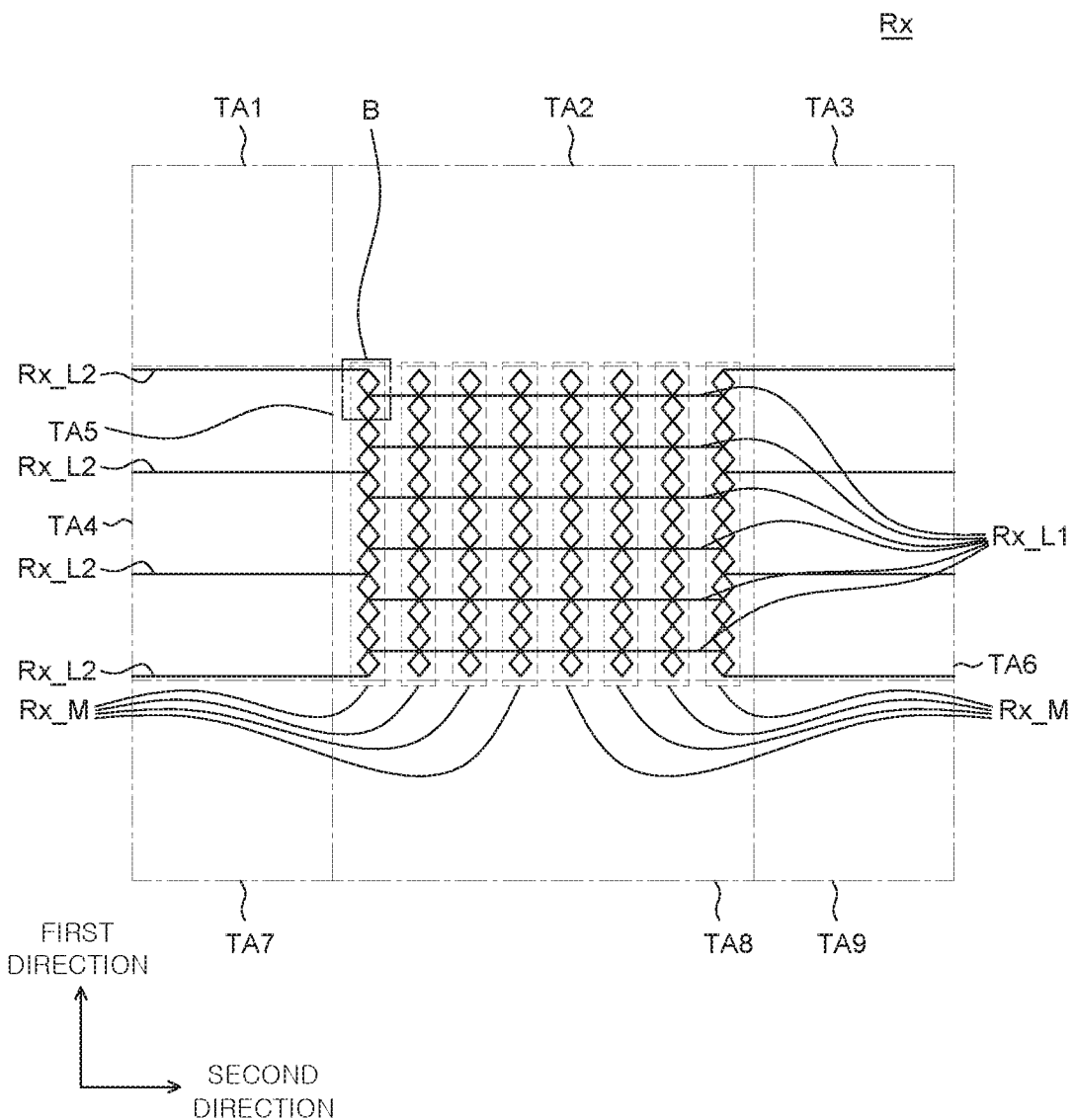

FIG. 3A is a view for explaining a first touch electrode unit Tx of a touch screen panel according to an embodiment of the present disclosure and FIG. 3B is a view for explaining a second touch electrode unit Rx of a touch screen panel according to an embodiment of the present disclosure.

Here, the first touch electrode unit Tx illustrated in FIG. 3A and the second touch electrode unit Rx illustrated in FIG. 3B are separately illustrated only to better show the operation of the first and second touch electrode units Tx and Rx. However, in the touch screen panel 113 according to the embodiment of the present disclosure, the first touch electrode unit Tx and the second touch electrode unit Rx are disposed to overlap each other in the fifth touch area TA5.

As illustrated in FIG. 3A, the first touch electrode unit Tx includes a plurality of first mesh patterns Tx_M and a plurality of first internal connection lines Tx_L1 which are all disposed in the fifth touch area TA5, and further includes a plurality of first external connection lines Tx_L2 which are disposed in the second touch area TA2 and the eighth touch area TA8.

The plurality of first mesh patterns Tx_M are disposed in the fifth touch area TA5 to sense the touch operation.

Specifically, the plurality of first mesh patterns Tx_M extending in the first direction are disposed to be spaced apart from each other. Since the plurality of first mesh patterns Tx_M extending in the first direction are spaced apart from each other, a space between the first mesh patterns Tx_M can be generated.

The first mesh patterns Tx_M illustrated in FIG. 3A extend in columns, but are not limited thereto and various types and configurations of mesh patterns can be used. Specifically, the mesh pattern can be configured to be located in the middle between a plurality of sub pixels R, G, and B in a bank area between the plurality of sub pixels R, G, and B.

The plurality of first internal connection lines Tx_L1 connect the plurality of first mesh patterns Tx_M disposed to be spaced apart from each other, to each other, to effectively transmit a touch signal between the first mesh patterns Tx_M disposed to be spaced apart from each other.

Specifically, the plurality of first internal connection lines Tx_L1 extend in the second direction and are disposed to be spaced apart from each other to electrically connect the plurality of first mesh patterns Tx_M extending in the first direction to each other. The plurality of first internal connection lines Tx_L1 can be disposed parallel to each other or substantially parallel to each other.

By this configuration, the touch signal can be effectively shared by all of the plurality of first mesh patterns Tx_M.

Further, even though the first internal connection lines Tx_L1 can be formed in various patterns, such as a zigzag pattern or a wavy pattern, the first internal connection lines can be desirably straight lines extending in the second direction. The plurality of first internal connection lines Tx_L1 are formed to be straight lines so that a resistance of the first internal connection lines Tx_L1 is reduced. By doing this, the touch signal applied through the first internal connection lines Tx_L1 is effectively transmitted so that a response speed of the touch screen panel 113 can be improved. In FIG. 3A, the first internal connection lines Tx_L1 are illustratively expressed as straight lines, but are not limited thereto and can be configured in a pattern which is not a straight line. Further, the first internal connection lines Tx_L1 can be formed along banks between the plurality of sub pixels R, G, B in a direction intersecting the first external connection lines Tx_L2.

In other words, in order to form the first internal connection lines Tx_L1 to be straight lines, a shape of the sub pixels can be modified. For example, in order to form the first internal connection lines Tx_L1 to be straight lines, shapes of the sub pixels R and G located on both sides of the first internal connection lines Tx_L1 can be designed in the form of facing triangles. Here, the shapes of the sub pixels R and G can be triangles which are designed such that one sides of the triangles are parallel to each other with respect to the first internal connection lines Tx_L1.

The plurality of first external connection lines Tx_L2 serve to connect the first mesh pattern Tx_M of the touch sensor TS with external component(s).

For example, the plurality of first external connection lines Tx_L2 connect the plurality of first mesh patterns Tx_M with an external touch sensor TS adjacent thereto or connect the plurality of first mesh patterns Tx_M with the fourth to sixth routing lines RL4 to RL6 (see FIG. 1).

Specifically, the plurality of first external connection lines Tx_L2 with respect to the seventh touch sensor TS7 illustrated in FIG. 1 will be described. Referring to FIGS. 1 and 3A, the plurality of first external connection lines Tx_L2 disposed in the second touch area TA2 of the seventh touch sensor TS7 are connected to the fourth touch sensor TS4 disposed above the seventh touch sensor TS7. The plurality of first external connection lines Tx_L2 disposed in the eighth touch area TA8 of the seventh touch sensor TS7 are connected to the fourth routing line RL4 disposed below the seventh touch sensor TS7.

Here, the plurality of first external connection lines Tx_L2 can be formed to have various shapes such as a straight line or a mesh, but can be desirably formed to have a zigzag pattern in consideration of the shape of the sub pixels of the display device, the shape of the bank BNK, and the transmittance.

Further, the plurality of first mesh patterns Tx_M, the first internal connection lines Tx_L1, and the first external connection lines Tx_L2 which configure the first touch electrode unit Tx can be formed in the same layer. That is, a layer in which the first mesh patterns Tx_M are formed, a layer in which the first internal connection lines Tx_L1 are formed, and a layer in which the first external connection lines Tx_L2 are formed can be the same layer. For instance, the bottom surfaces of the first mesh patterns Tx_M, the first internal connection lines Tx_L1, and the first external connection lines Tx_L2 can be coplanar. Therefore, the first touch electrode unit Tx can be formed by one process.

Further, the plurality of first mesh patterns Tx_M, the first internal connection lines Tx_L1, and the first external connection lines Tx_L2, which configure the first touch electrode unit Tx, can be formed of a metal having a high electric conductivity. For example, the plurality of first mesh patterns Tx_M, the first internal connection lines Tx_L1, and the first external connection lines Tx_L2, which configure the first touch electrode unit Tx, can be formed of a single layer or multiple layers formed of aluminum (Al), copper (Cu), molybdenum (Mo), chrome (Cr), gold (Au), titanium (Ti), nickel (Ni), neodymium (Nd), or an alloy thereof. The first touch electrode unit Tx is formed of the metal having excellent electric conductivity so that a touch signal for driving the touch screen panel 113 can be quickly transmitted from the external touch driver to the first touch electrode unit Tx. Since the touch signal transmitting speed is improved, the touch driver can quickly sense the touch operation of the user so that the response speed of the touch screen panel 113 can be improved.

As illustrated in FIG. 3B, the second touch electrode unit Rx includes a plurality of second mesh patterns Rx_M and a plurality of second internal connection lines Rx_L1 which are all disposed in the fifth touch area TA5, a connection pattern, and a plurality of second external connection lines Rx_L2 disposed in the fourth touch area TA4 and the sixth touch area TA6. In the example of FIG. 3B, the second mesh patterns Rx_M, the second internal connection lines Rx_L1, and the second external connection lines Rx_L2 are shown in solid lines, although they are shown in dotted lines in FIGS. 2A and 2B. The second internal connection lines Rx_L1 and the second external connection lines Rx_L2 are electrically connected to each other through the second mesh pattern Rx_M. Here, the second internal connection lines Rx_L1 and the first internal connection lines Tx_L1 are disposed so as not to overlap each other. For example, both the second internal connection lines Rx_L1 and the first internal connection lines Tx_L1 can be straight lines which extend in the second direction to be parallel to each other.

Figure 4A:
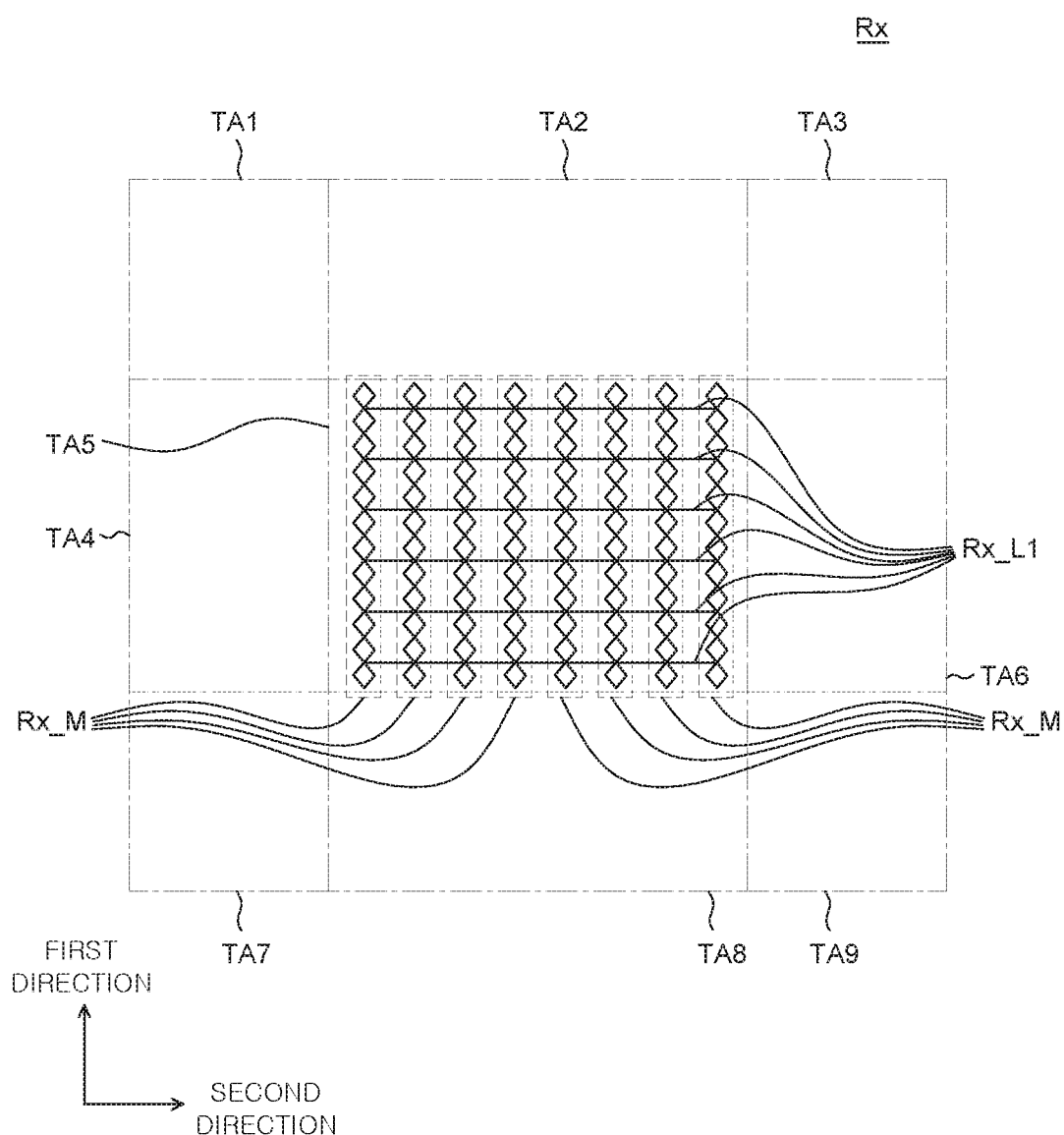
FIG. 4A is a view selectively illustrating only a part of a second mesh pattern and a second internal connection line of a touch screen panel according to an embodiment of the present disclosure and FIG. 4B is a view selectively illustrating only a part of a second external connection line and a connection pattern of a touch screen panel according to an embodiment of the present disclosure.
Figure 4B:
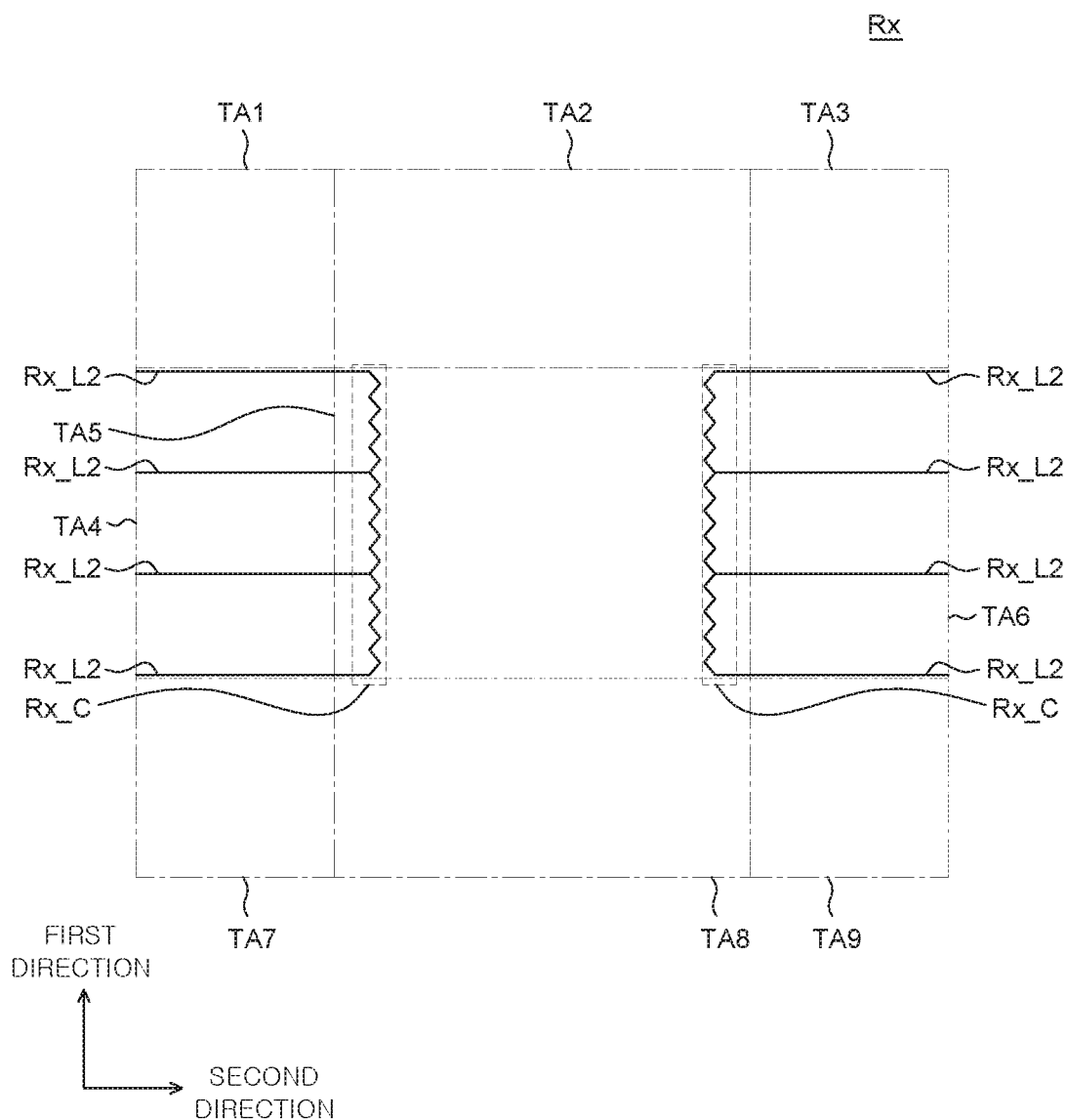

FIG. 4A is a view selectively illustrating only parts of a second mesh pattern and a second internal connection line of a touch screen panel according to an embodiment of the present disclosure. FIG. 4B is a view selectively illustrating only parts of a second external connection line and a connection pattern of a touch screen panel according to an embodiment of the present disclosure. Therefore, a part of FIG. 4A and a part of FIG. 4B can be omitted or repeated. That is, FIGS. 4A and 4B show only parts of one touch sensor (e.g., TS1) of the touch screen panel 113 shown in FIGS. 2A to 3B for easy explanation, where each of the touch sensors TS1 to TS9 can have this configuration.

The plurality of second mesh patterns Rx_M are disposed in the fifth touch area TA5 to sense the touch operation by the touch driver.

Referring to FIGS. 2A and 4A, the plurality of second mesh patterns Rx_M extending in the first direction are disposed to be spaced apart from each other. Further, the second mesh patterns Rx_M extending in the first direction are disposed between the plurality of first mesh patterns Tx_M to be spaced apart from each other. That is, the second mesh patterns Rx_M and the first mesh patterns Tx_M can be alternately disposed on different layers in the second direction.

The second mesh patterns Rx_M illustrated in FIG. 4A extend in columns, but are not limited thereto and various types and configurations of mesh patterns can be used.

The plurality of second internal connection lines Rx_L1 connect the plurality of second mesh patterns Rx_M disposed to be spaced apart from each other to effectively transmit a touch signal between the second mesh patterns Rx_M disposed to be spaced apart from each other.

Specifically, the plurality of second internal connection lines Rx_L1 extend in the second direction and are disposed between the plurality of first internal connection lines Tx_L1 spaced apart from each other to electrically connect the plurality of second mesh patterns Rx_M extending in the first direction to each other.

By doing this, the touch signal can be effectively shared by all of the plurality of second mesh patterns Rx_M.

Further, even though the second internal connection lines Rx_L1 can be formed in various patterns, such as a zigzag pattern, the second internal connection lines can be desirably straight lines extending in the second direction. The plurality of second internal connection lines Rx_L1 are formed to be straight lines so that resistance of the second internal connection lines Rx_L1 can be reduced. By doing this, the touch signal applied through the second internal connection lines Rx_L1 is effectively transmitted so that a response speed of the touch screen panel 113 can be improved.

The second internal connection lines Rx_L1 are illustratively expressed as straight lines, but are not limited thereto and can be configured in a pattern which is not a straight line. The second internal connection lines Rx_L1 can be formed along banks between the plurality of sub pixels R, G, B in a direction parallel to the second external connection lines Rx_L2.

In other words, in order to form the second internal connection lines Rx_L1 to be straight lines, the shape of the sub pixels of the display panel can be modified. For example, in order to form the second internal connection lines Rx_L1 to be straight lines, shapes of the sub pixels R and G located on both sides of the second internal connection lines Rx_L1 can be designed in the form of facing triangles. Here, the shapes of the sub pixels R and G can be triangles which are designed such that one sides of the triangles are parallel to each other with respect to the first internal connection lines Rx_L1.

In some embodiments, the first mesh patterns Tx_M having a rhombic shape extending in the first direction and the second mesh patterns Rx_M having a rhombic shape extending in the first direction are alternately disposed in the second direction. The first straight internal connection lines Tx_L1 extending in the second direction and the second straight internal connection lines Rx_L1 extending in the second direction are alternately disposed in the first direction, but the arrangement is not limited thereto. According to the above-described configuration, the resistance of the touch sensor TS can be minimized by the straight internal connection lines Tx_L1 and Rx-L1 and the touch sensitivity can be improved by the mesh pattern.

Figure 5A:
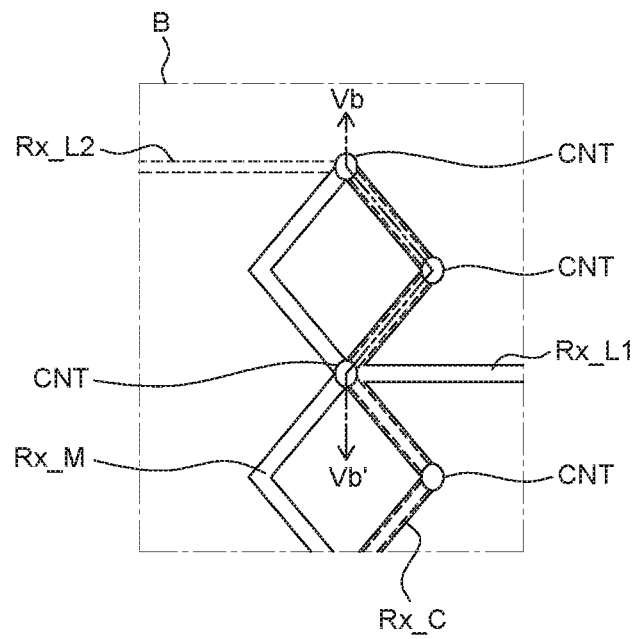
FIG. 5A is an enlarged view of a region B illustrated in FIG. 3B

Referring to FIGS. 4B and 5A, the plurality of second external connection lines Rx_L2 serve to connect the second mesh pattern Rx_M of the touch sensor TS with the external component(s).

For example, the plurality of second external connection line Rx_L2 connect the plurality of second mesh patterns Rx_M to an external touch sensor TS adjacent thereto or connects the plurality of second mesh patterns Rx_M to the first to third routing lines RL1, RL2, and RL3.

Specifically, the plurality of second external connection line Rx_L2 will be described with respect to the third touch sensor TS3 illustrated in FIG. 1. The plurality of second external connection lines Rx_L2 disposed in the fourth touch area TA4 of the third touch sensor TS3 are connected to the second touch sensor TS2 disposed at a left side of the third touch sensor TS3. The plurality of second external connection line Rx_L2 disposed in the sixth touch area TA6 of the third touch sensor TS3 are connected to the first routing line RL1 disposed at a right side of the third touch sensor TS3.

Here, even though the second external connection lines Rx_L2 can also be formed in various patterns, such as a zigzag pattern, the second external connection lines can be desirably straight lines extending in the second direction. The plurality of second external connection lines Rx_L2 are formed to be straight lines so that the resistance of the second external connection lines Rx_L2 can be reduced. By doing this, the touch signal applied through the second external connection lines Rx_L2 is effectively transmitted so that a response speed of the touch screen panel 113 can be improved.

The second external connection lines Rx_L2 are illustratively expressed as straight lines, but are not limited thereto and can be configured in a pattern which is not a straight line. The second external connection lines Rx_L2 can be formed along banks between the plurality of sub pixels R, G, B in a direction intersecting the first external connection lines Tx_L2.

As shown in FIG. 4B, a zigzag type connection pattern Rx_C is disposed in the first direction to be connected to the second external connection line(S) Rx_L2 extending in the second direction and connected to the second mesh pattern Rx_M and the second internal connection line Rx_L1 formed in another layer to bring the second mesh pattern Rx_M, the second internal connection line Rx_L1, and the second external connection line Rx_L2 in electrical contact with each other.

Further, as illustrated in FIG. 4B, the connection pattern Rx_C can have a zigzag pattern partially overlapping the second mesh pattern Rx_M, but is not limited thereto, and can have various shapes such as a straight line or a mesh. An arrangement of a specific connection pattern Rx_C will be described below with reference to FIGS. 5A and 5B.

Further, the plurality of second mesh patterns Rx_M, the second internal connection lines Rx_L1, the connection patterns Rx_C, and the second external connection lines Rx_L2, which configure the second touch electrode unit Rx, can be formed of a metal having a high electric conductivity. For example, the plurality of second mesh patterns Rx_M, the second internal connection lines Rx_L1, the connection patterns Rx_C, and the second external connection lines Rx_L2, which configure the second touch electrode unit Rx, can be formed of a single layer or multiple layers formed of aluminum (Al), copper (Cu), molybdenum (Mo), chrome (Cr), gold (Au), titanium (Ti), nickel (Ni), neodymium (Nd), or an alloy thereof. As described above, the second touch electrode unit Rx is formed of the metal having an excellent electric conductivity so that a touch signal for driving the touch screen panel 113 can be quickly transmitted from the external touch driver to the second touch electrode unit Rx. Since the touch signal transmitting speed is improved, the touch driver can quickly sense the touch operation of the user so that the response speed of the touch screen panel 113 can be improved.

Figure 5B:
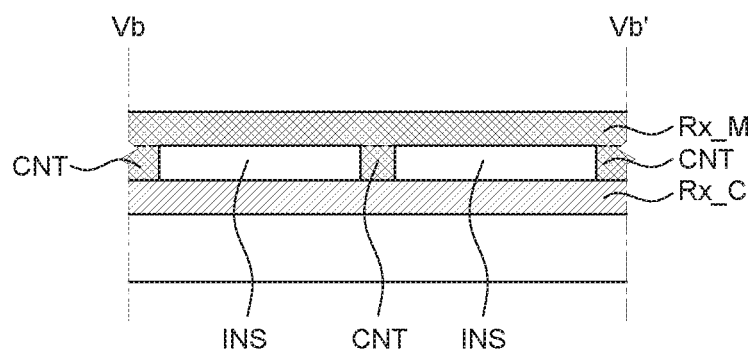
FIG. 5B is a cross-sectional view taken along the line Vb-Vb' illustrated in FIG. 5A.

FIG. 5A is an enlarged view of a region B illustrated in FIG. 3B and FIG. 5B is a cross-sectional view taken along the line Vb-Vb' illustrated in FIG. 5A.

As illustrated in the example of FIG. 5A, the second external connection line Rx_L2 and the connection pattern Rx_C which are represented by the dotted line are connected to each other on the same layer. Further, the second mesh pattern Rx_M and the second internal connection line Rx_L1 which are represented by the solid line are disposed on the different layer from a layer in which the above-described second connection line Rx_L2 and the connection pattern Rx_C are formed. The connection pattern Rx_C and the second mesh pattern Rx_M formed in different layers are electrically connected through a plurality of contact holes CNT.

Specifically, as illustrated in FIG. 5B, an insulating layer INS is formed between the layer in which the second external connection line Rx_L2 and the connection pattern Rx_C are formed and the layer in which the second mesh pattern Rx_M and the second internal connection line Rx_L1 are formed. The connection pattern Rx_C and the second mesh pattern Rx_M formed in different layers are electrically connected through at least one contact hole CNT formed in the insulating layer INS. By doing this, the second mesh pattern Rx_M can be connected to the second external connection line Rx_L2 through at least one contact hole CNT.

An interlayer structure of the first touch electrode unit Tx and the second touch electrode unit Rx will be summarized as follows. The plurality of first mesh patterns Tx_M, the first internal connection lines Tx_L1, and the first external connection lines Tx_L2, which configure the first touch electrode unit Tx, and the second external connection lines Rx_L2 and the connection patterns Rx_C of the second touch electrode unit Rx are formed in a first layer which is the same layer. However, the second mesh patterns Rx_M and the second internal connection lines Rx_L1 of the second touch electrode unit Rx are formed in a second layer which is different from the first layer.

The insulating layer INS is disposed between the first layer and the second layer for electrical insulation. However, the second mesh pattern Rx_M, the second internal connection line Rx_L1, the second external connection line Rx_L2, and the connection pattern Rx_C of the second touch electrode unit Rx are electrically connected to each other through the plurality of contact holes CNT formed in the insulating layer INS. Therefore, the first touch electrode unit Tx and the second touch electrode unit Rx are electrically separated.

Figure 6:
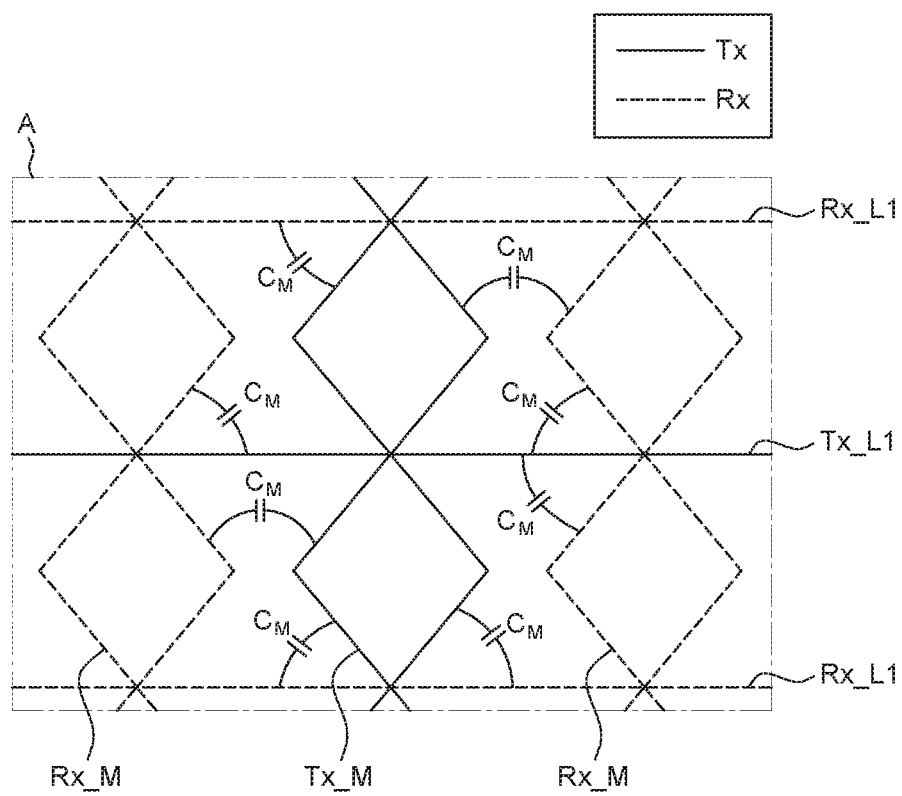
FIG. 6 is an enlarged view of a region A illustrated in FIG. 2A.

FIG. 6 is an enlarged view of a region A illustrated in FIG. 2A.

As described above, the first touch electrode unit Tx and the second touch electrode unit Rx are electrically separated.

Accordingly, as illustrated in FIG. 6, a mutual capacitance CM between the first mesh pattern Tx_M and the second mesh pattern Rx_M, a mutual capacitance CM between the first mesh pattern Tx_M and the second internal connection line, a mutual capacitance CM between the first internal connection line Tx_L1 and the second mesh pattern Rx_M, and a mutual capacitance CM between the first internal connection line Tx_L1 and the second internal connection line are generated.

The first touch electrode unit Tx and the second touch electrode unit Rx are disposed to intersect each other in the fifth touch area TA5 which is a sensing area, so that the mutual capacitance CM for touch sensing can be maximized.

In contrast, the first to third touch areas TA1 to TA3 and the seventh to ninth touch areas TA7 to TA9, which are not sensing areas, do not involve touch sensing so that a redundant parasitic capacitance with the inside and the outside of the touch screen panel 133 can be reduced. Therefore, a redundant load of the touch screen panel 113 is minimized so that the touch response speed of the touch screen panel 113 can be improved.

Here, the size of the fifth touch area TA5 which is a sensing area can be set to 9/4 or less of the entire size of the touch sensor TS. When the size of the fifth touch area TA5 is larger than 9/4 of the entire size of the touch sensor TS, a parasitic capacitance in the touch screen panel 113 or a parasitic capacitance with the outside of the touch screen panel 113 is increased so that a redundant load of the touch screen panel 113 is increased. Therefore, the touch response speed of the touch screen panel 113 is lowered. Therefore, in order to improve the response speed of the touch screen panel 113, the size of the fifth touch area TA5 which is a sensing area can be set to 9/4 or less of the entire size of the touch sensor TS.

Further, when the fifth touch area TA5 is larger than 9/4 of the touch sensor, a position between coordinates is not subdivided, so that the touch precision can be lowered.

Figure 7A:
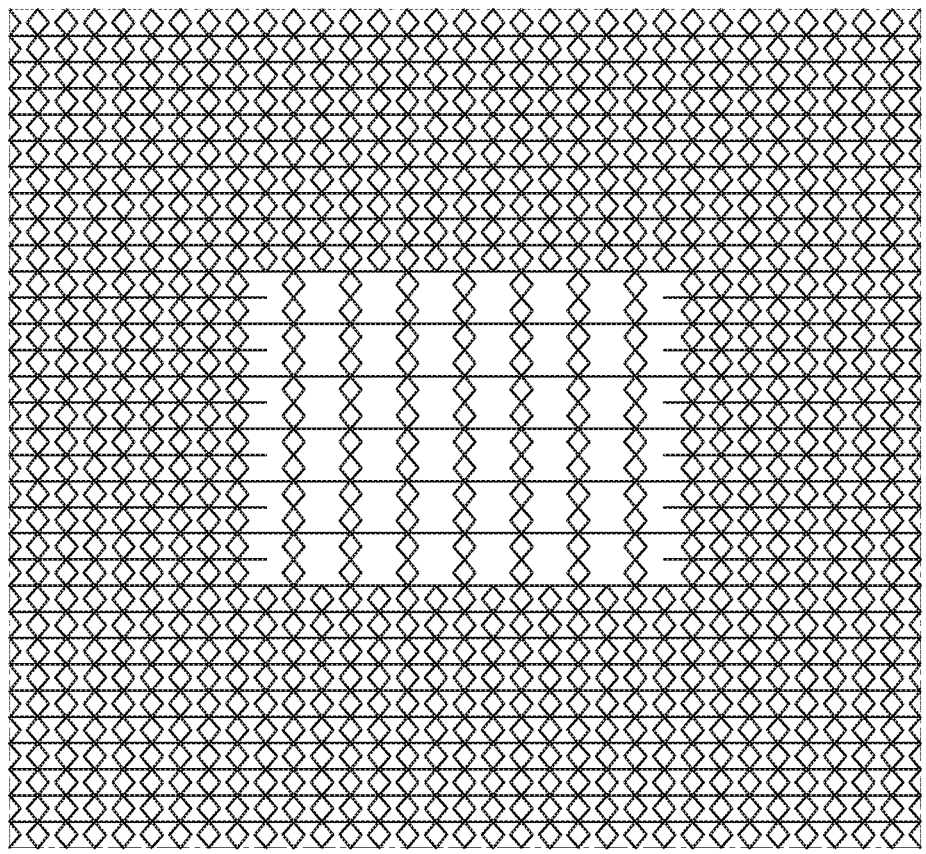
FIGS. 7A and 7B are views for explaining a dummy electrode of a touch screen panel according to an embodiment of the present disclosure.
Figure 7B:
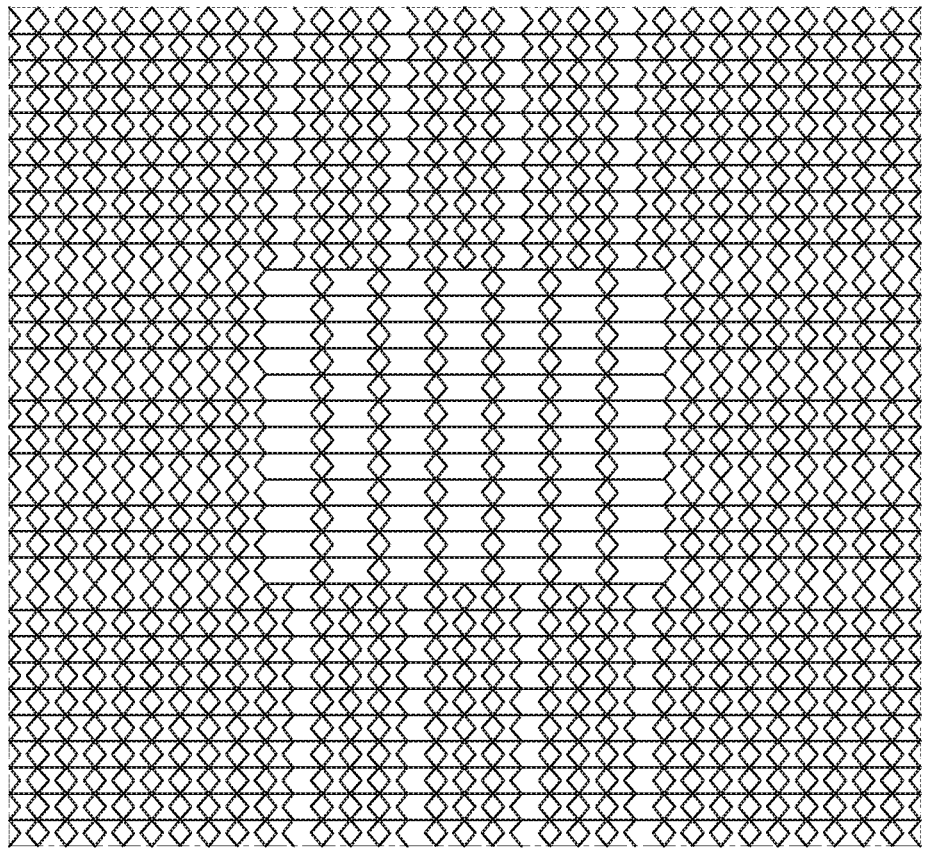

FIGS. 7A and 7B are views for explaining two examples of a dummy electrode of a touch screen panel according to an embodiment of the present disclosure.

The touch sensor TS of the touch screen panel 113 according to the embodiment of the present disclosure can further include mesh pattern dummy electrodes DM1 and DM2.

The dummy electrodes DM1 and DM2 can be formed of a mesh pattern metal over the first touch area TA1 to the ninth touch area TA9.

That is, the dummy electrodes DM1 and DM2 can be formed of a mesh pattern metal in an area excluding an area where the first touch electrode unit Tx and the second touch electrode unit Rx are disposed among the entire area of the first touch sensor TS1.

Specifically, as shown in FIG. 7A, when a second layer is disposed above the above-described first layer, the dummy electrode DM1 can be formed of the mesh pattern metal in an area excluding the area where the second mesh pattern Rx_M and the second internal connection line Rx_L1 of the second touch electrode Rx are disposed on the second layer which is an upper layer.

As another example, as shown in FIG. 7B, when the first layer is disposed above the above-described second layer, the dummy electrode DM2 can be formed of the mesh pattern metal in an area excluding an area where the plurality of first mesh patterns Tx_M, the first internal connection line Tx_L1, and the first external connection line Tx_L2 which configure the first touch electrode unit Tx and the second external connection line Rx_L2 and the connection pattern Rx_C of the second touch electrode unit Rx are disposed on the first layer which is the upper layer.

Here, the mesh pattern of the dummy electrodes DM1 and DM2 can have the same size and the same pattern as the first mesh pattern and the second mesh pattern described above, but it is not limited thereto.

As described above, in the touch screen panel 113 according to the embodiment of the present disclosure, the dummy electrodes DM1 and DM2 are formed so that the same mesh pattern can be formed in the entire area of the first touch sensor TS1 including the first to ninth touch areas TA1 to TA9. By doing this, the mesh pattern is uniformly disposed in the first touch sensor TS1 of the touch screen panel 113 so that a specific pattern caused by the first touch sensor TS1 cannot be perceived by a viewer.

Further, the dummy electrodes DM1 and DM2 of the touch screen panel 113 are coupled by a touch signal to serve as the first touch electrode unit Tx. Consequently, the mutual capacitance Cm is additionally generated in the touch sensor TS due to the dummy electrodes DM1 and DM2. Therefore, the touch sensitivity of the touch screen panel 113 can be improved.

Hereinafter, a display device including the above-described touch screen panel according to an embodiment of the present disclosure will be described. Even though a duplicated description of the above-described touch screen panel according to an embodiment of the present disclosure will be omitted or brief, the display device including the touch screen panel according to the embodiment of the present disclosure includes all the technical features of the above-described touch screen panel according to the embodiment of the present disclosure.

Figure 8:
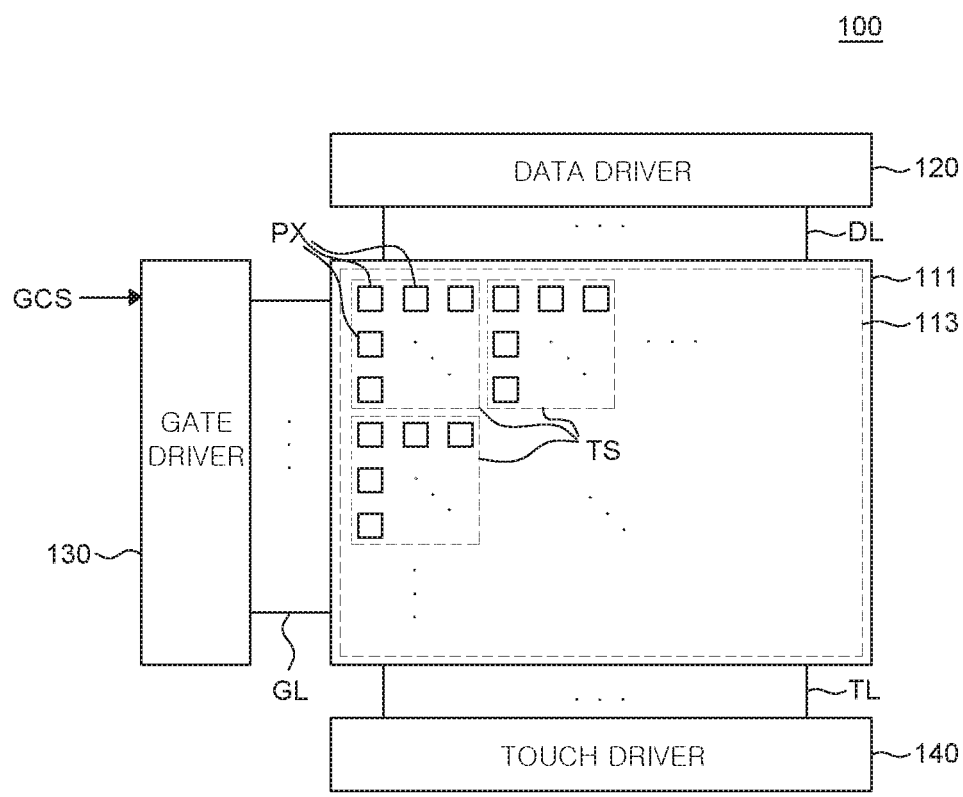
FIG. 8 is a schematic block diagram for explaining a display device including a touch screen panel according to an embodiment of the present disclosure.

FIG. 8 is a schematic block diagram of a display device including a touch screen panel according to an embodiment of the present disclosure. All the components of the display device according to all embodiments of the present disclosure are operatively coupled and configured.

Referring to FIG. 8, a display device 100 includes a display panel 111, a touch screen panel 113, a data driver 120, a gate driver 130, and a touch driver 140. Here the touch screen panel 113 preferably is the touch screen panel 113 of FIGS. 1-7B.

The display panel 111 includes a substrate using glass or plastic and a plurality of gate lines GL and a plurality of data lines DL disposed on the substrate to intersect each other. A plurality of pixels PX are defined at the intersections of the plurality of gate lines GL and the plurality of data lines DL. Each of the plurality of pixels PX of the display panel 111 includes at least one thin film transistor.

Further, when the display device 100 according to the embodiment of the present disclosure is an electroluminescent display device, electric current is applied to an electroluminescent diode equipped in the plurality of pixels PX, and discharged electrons and holes are coupled to generate excitons. The excitons emit light to implement a gray scale of the electroluminescent display device.

The display device 100 according to the embodiment of the present disclosure is not limited to the electroluminescent display device, but can be various types of display device such as a liquid crystal display device.

Figure 9:
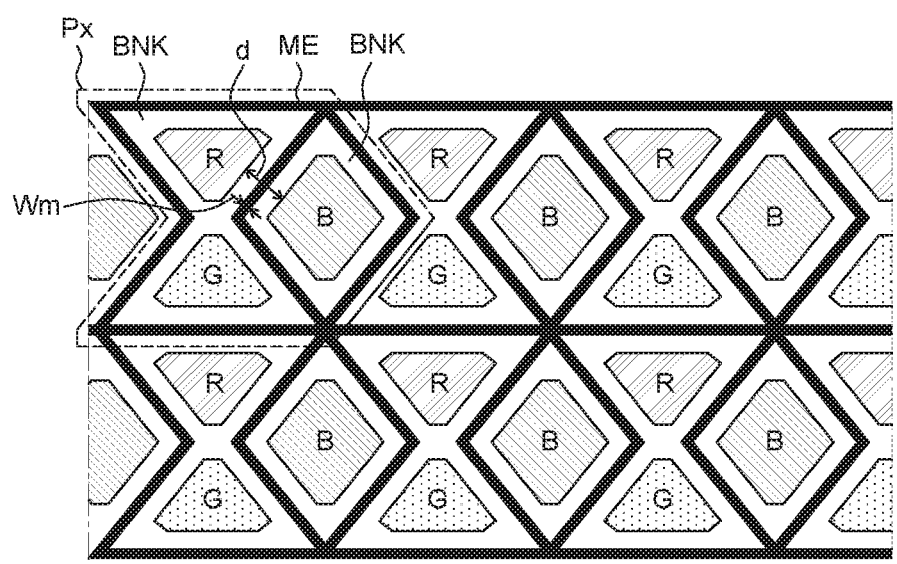
FIG. 9 is a view for explaining a pixel of a display device including a touch screen panel according to an embodiment of the present disclosure.

FIG. 9 is a view for explaining a pixel of a display device including a touch screen panel according to an embodiment of the present disclosure. In this example, the pixel can be the pixel PX in the display device of FIG. 8, which includes the touch screen panel 113.

Referring to FIG. 9, the plurality of pixels PX includes a plurality of sub pixels R, G, and B to implement light of a specific color. For example, the plurality of pixels PX can be configured by a red sub pixel R which implements red, a green sub pixel G which implements green, and a blue sub pixel B which implements blue, but are not limited thereto.

The red sub pixel R, the green sub pixel G, and the blue sub pixel B are enclosed by a bank BNK. That is, the red sub pixel R, the green sub pixel G, and the blue sub pixel B are divided by the bank BNK. Cathodes CTD (FIG. 10) are formed below the red sub pixel R, the green sub pixel G, and the blue sub pixel B to drive the red sub pixel R, the green sub pixel G, and the blue sub pixel B. In addition, a cathode may cover the bank BNK and the sub pixels R, G, and B.

Here, shapes of the sub pixels R, G, and B can be configured by a triangle or a rhombic shape in consideration of a performance of the touch sensor TS and a quality of an image. Therefore, it is easy to simultaneously provide a zigzag electrode and a straight line electrode, but it is not limited thereto. In other words, the shape of the sub pixels R, G, and B is represented by a triangle or a rhombus, for the convenience of description. However, substantially, a corner thereof can be formed not to be sharp and each side can be formed to be curved, rather than a straight line. A non-sharp corner in a respective sub pixel may have the effect that current concentration at this corner, which may generate heat and may damage the sub pixel, may be reduced compared to a sharp corner.

The touch screen panel 113 is bonded onto the display panel 111 to sense a touch input of the user. Specifically, the touch screen panel 113 includes a plurality of touch sensors TS and each touch sensor TS senses the touch of the user. Here, the touch sensor TS can be formed to have a size corresponding to a size of the plurality of pixels PX.

Figure 10:
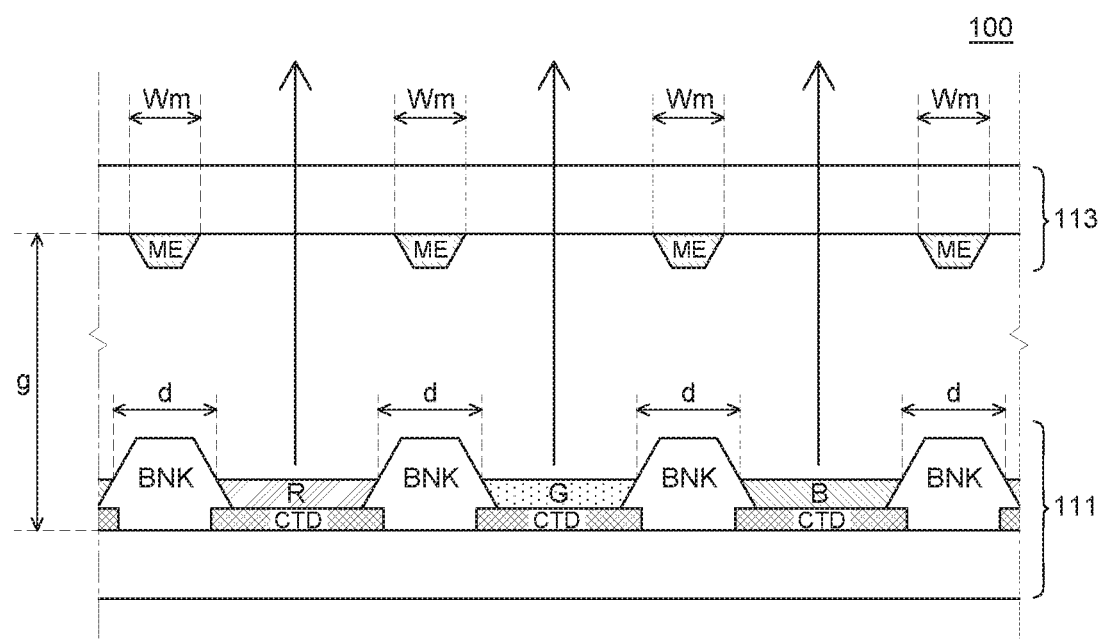
FIG. 10 is a cross-sectional view illustrating a display device including a touch screen panel according to an embodiment of the present disclosure.

FIG. 10 is a cross-sectional view illustrating a display device including a touch screen panel (e.g., the display device 100 of FIG. 9) according to an embodiment of the present disclosure.

As shown in FIGS. 9 and 10, the touch screen panel 113 includes the touch sensors TS. Each touch sensor TS includes a first touch electrode unit Tx and a second touch electrode unit Rx, and the first touch electrode unit Tx and the second touch electrode Rx are disposed on the bank BNK of the display panel 111.

Specifically, referring to FIG. 10, the display device 100 includes the display panel 111 including a red sub pixel R, a green sub pixel G, and a blue sub pixel B defined by a plurality of banks BNK and the touch screen panel 113 including a first touch electrode unit Tx and a second touch electrode unit Rx.

Here, the display panel 111 and the touch screen panel 113 are bonded while maintaining a predetermined cell gap g. Further, the display panel 111 having a structure which is advantageous to be flexible is configured to include an encapsulating layer and an adhesive layer, and the cell gap g is determined from the structure. The cell gap g of the electroluminescent display device can be reduced to 5 μm to 30 μm for the purpose of flexible performance. Specifically, the thinner the cell gap g, the larger the parasitic capacitance by the cathode CTD. However, even though the cell gap g is reduced by the structure of the touch sensor TS according to an embodiment of the present disclosure, the parasitic capacitance can be easily lowered. Therefore, the touch performance and the response speed can be improved.

For the convenience of description, the first touch electrode unit Tx and the second touch electrode unit Rx are unified as a mesh electrode ME and will be described below referring to FIGS. 9 and 10.

The touch screen panel 113 and the display panel 111 can be bonded so that the mesh electrode ME of the touch screen panel 113 is disposed on a bank BNK of the display panel 111.

Here, the bank BNK does not emit light so that even though the mesh electrode ME, that is, the first touch electrode unit Tx and the second touch electrode Rx are disposed on the bank BNK, the transmittance of the display device 100 cannot be substantially deteriorated. The mesh electrode ME can be a metal electrode.

The first touch electrode unit and the second touch electrode unit Rx are disposed on the bank BNK so that red light, green light, and blue light emitted from the red sub pixel R, the green sub pixel G, and the blue sub pixel B are not mixed.

That is, the mesh type first touch electrode unit Tx and the mesh type second touch electrode unit Rx are disposed on the mesh type bank BNK so that the optical property of the display panel 111 can be improved.

In some embodiments, when a distance d between the sub pixel R, G, B and another adjacent sub pixel R, G, and B is 22 μm to 26 μm and the cell gap g is 21 μm to 25 μm, a width (Wm) of each of all the mesh electrodes ME which configure the first electrode unit Tx and the second touch electrode unit Rx can be 1 μm to 5 μm.

When the width of all the mesh electrodes ME which configure the first touch electrode unit Tx and the second touch electrode unit Rx is larger than 5 μm, the transmittance of the display device is significantly lowered due to the touch screen disposed on the display panel so that an image quality is lowered. Further, when the width of the mesh electrode ME which configures the first touch electrode unit Tx and the second touch electrode unit Rx is smaller than 1 μm, red light, green light, and blue light emitted from the red sub pixel R, the green sub pixel G, and the blue sub pixel B are disadvantageously mixed.

But, the present disclosure is not limited thereto and a width of the mesh electrode ME which configures the first touch electrode unit Tx and the second touch electrode unit Rx can be determined depending on a distance d between the sub pixels R, G, and B and other sub pixels R, G, and B adjacent thereto.

The touch sensors TS are connected to the touch driver 140 through one or more touch lines TL connected to the first pad PAD1 and the second pad PAD2 of the touch screen panel 113. The touch driver 140 and the touch sensors TS are connected as described above to sense the touch of the user.

The touch driver 140 is connected to the touch sensor TS through the touch line TL to determine whether there is a touch of the user and a touch position. That is, when the user touches a partial area of the touch screen panel 113, the touch driver 140 senses a change of the capacitance of the touch sensor TS disposed in the touched partial area of the touch screen panel 113 to determine whether the user touches the touch screen panel 113 and the touch position.

Specifically, the touch driver 140 can transmit or receive a touch signal which is a specific level of a square wave through the touch sensor TS. The touch driver 140 senses a change ΔC of the capacitance of the touch sensor TS through the touch signal applied to the touch sensor TS. The touch driver 140 can sense the touch of the touch screen panel 113 through the above-described process. The method of sensing the touch using the touch sensor TS is classified into: (a) a mutual capacitive manner which senses a change of the mutual capacitance of the touch sensor and (b) a self-capacitive manner which senses a self-capacitance of the touch sensor.

The gate driver 130 sequentially supplies a gate voltage of an on-voltage or an off-voltage to the gate line GL in accordance with a gate control signal GCS output from a timing controller.

The gate control signal GCS includes a gate start pulse GSP, a gate shift clock GSC, and a gate output enable signal GOE.

Here, the gate start pulse GSP controls an operation start timing of one or more gate circuits which configure the gate driver 130. The gate shift clock is a clock signal which is commonly input to one or more gate circuits and controls a shift timing of the scan signal (gate pulse). The gate output enable signal designates timing information of one or more gate circuits.

According to a driving method, the gate driver 130 can be located only at one side of the display panel 111 or located at both sides as necessary.

The gate driver 130 can include a shift register and a level shifter.

The data driver 120 converts image data received from the timing controller into an analog data voltage Vdata based on the data control signal DCS to output the converted analog data voltage to the data line DL.

Here, the data control signal DCS includes a source start pulse SSP, a source sampling clock SSC, and a source output enable signal SOE.

The source start pulse controls a data sampling start timing of one or more data circuits which configure the data driver 120. The source sampling clock is a clock signal which controls a sampling timing of data in each data circuit. The source output enable signal controls an output timing of the data driver 120.

The data driver 120 can be connected to a bonding pad of the display panel 111 by a tape automated bonding method or a chip on glass method or can be directly disposed on the display panel 111. As needed, the data driver 120 can be disposed to be integrated in the display panel 111.

The data driver 120 can include a logic unit including various circuits such as a level shifter or a latch unit, a digital analog converter DAC, and an output buffer.

As described above, the touch screen panel according to the aspects of the present disclosure forms mutual capacitance at maximum for sensing the touch by disposing a first touch electrode unit and a second touch electrode unit to intersect each other in a sensing area so that a redundant load can be minimized in an area other than the sensing area of the touch screen panel to improve a touch response speed of the touch screen panel.

Further, according to an aspect of the present disclosure, the display device including the touch screen panel can dispose a mesh type first touch electrode and a mesh type second touch electrode on a mesh type bank to improve optical characteristics of the display panel.

The embodiments of the present disclosure can also be described as follows.

According to an aspect of the present disclosure, a touch screen panel includes a plurality of touch sensors and each of the touch sensors includes a first touch electrode unit extending in a first direction, and a second touch electrode unit extending in a second direction. The first touch electrode unit includes a plurality of first mesh pattern electrodes that are disposed to be spaced apart from each other in a sensing area where the first touch electrode unit and the second touch electrode unit intersect. The second touch electrode unit includes a plurality of second mesh pattern electrodes that are disposed between the plurality of first mesh pattern electrodes to be spaced apart from each other in the sensing area.

According to another aspect of the present disclosure, the first touch electrode unit further includes a plurality of first internal connection lines connecting the plurality of first mesh pattern electrodes disposed to be spaced apart from each other, and the second touch electrode unit further includes a plurality of second internal connection lines connecting the plurality of second mesh pattern electrodes disposed to be spaced apart from each other.

According to still another aspect of the present disclosure, the plurality of first connection lines are disposed to be spaced apart from each other, and the plurality of second connection lines are disposed in the space between the plurality of first connection lines.

According to still another aspect of the present disclosure, the plurality of first internal connection lines and the plurality of second internal connection lines are straight lines.

According to still another aspect of the present disclosure, the first mesh pattern electrodes and the second mesh pattern electrodes extend in the same direction.

According to still another aspect of the present disclosure, the first touch electrode unit further includes a plurality of first external connection lines which connect the plurality of first mesh patterns of any one touch sensor of the plurality of touch sensors and another touch sensor adjacent to that touch sensor, and the second touch electrode unit further includes a plurality of second external connection lines which connect the plurality of second mesh patterns of any one touch sensor of the plurality of touch sensors and another touch sensor adjacent to that touch sensor.

According to still another aspect of the present disclosure, the plurality of second mesh patterns and the plurality of second external connection lines are disposed on different layers, an insulating layer is provided between a layer in which the plurality of second mesh patterns are formed and a layer in which the plurality of second external connection lines are formed, and the plurality of second mesh patterns are connected to the second external connection line through at least one contact hole formed in the insulating layer.

According to still another aspect of the present disclosure, a width of at least one of the first mesh pattern electrode and the second mesh pattern electrode is 1 μm to 5 μm.

According to still another aspect of the present disclosure, a size of the sensing area is 4/9 or less of a size of the entire area of the touch sensor.

According to another aspect of the present disclosure, a display device includes a display panel including a bank disposed on a substrate and a plurality of pixels defined by the bank, a touch screen panel including a plurality of touch sensors, and a touch driver which drives the touch screen panel. Each of the touch sensors includes a first touch electrode unit which is disposed on the bank and extends in a first direction, and a second touch electrode unit which is disposed on the bank and extends in a second direction. The first touch electrode unit includes a plurality of first mesh pattern electrodes which are disposed to be spaced apart from each other in a sensing area where the first touch electrode unit and the second touch electrode unit intersect, and the second touch electrode unit includes a plurality of second mesh pattern electrodes which are disposed between the plurality of first mesh pattern electrodes to be spaced apart from each other in the sensing area.

According to another aspect of the present disclosure, the first touch electrode unit further includes a plurality of first internal connection lines connecting the plurality of first mesh pattern electrodes disposed to be spaced apart from each other, and the second touch electrode unit further includes a plurality of second internal connection lines connecting the plurality of second mesh pattern electrodes disposed to be spaced apart from each other.

According to still another aspect of the present disclosure, the first mesh pattern electrodes and the second mesh pattern electrodes extend in the same direction.

According to still another aspect of the present disclosure, the first touch electrode unit further includes a plurality of first external connection lines which connect the plurality of first mesh patterns of any one touch sensor of the plurality of touch sensors and another touch sensor adjacent to that touch sensor, and the second touch electrode unit further includes a plurality of second external connection lines which connect the plurality of second mesh patterns of any one touch sensor of the plurality of touch sensors and another touch sensor adjacent to that touch sensor.

According to still another aspect of the present disclosure, a width of at least one of the first mesh pattern electrode and the second mesh pattern electrode is 1 μm to 5 μm.

According to still another aspect of the present disclosure, a size of the sensing area is 4/9 or less of a size of the entire area of the touch sensor.

According to still another aspect of the present disclosure, the sensing area is provided in a middle area of each of the plurality of touch sensors, and the first and second touch electrode units are not disposed in corner areas of each of the plurality of touch sensors.

According to still another aspect of the present disclosure, the touch screen panel further comprising: a dummy electrode extending to cover an area surrounding the sensing area in each of the plurality of touch sensors.

According to still another aspect of the present disclosure, the dummy electrode includes a first mesh pattern dummy electrode and a second mesh pattern dummy electrode, and the first mesh pattern dummy electrode and the second mesh pattern dummy electrode are coupled by a touch signal.

According to still another aspect of the present disclosure, the touch screen panel further includes a plurality of dummy electrodes formed of a mesh pattern metal in an area excluding an area where the first touch electrode unit and the second touch electrode unit are disposed among the entire area of the respective touch sensor.

According to another aspect of the present disclosure, a display device includes a display panel including a bank disposed on a substrate and a plurality of pixels defined by the bank, a touch screen panel according to one or more embodiments described herein; and a touch driver which drives the touch screen panel, wherein each first touch electrode unit is disposed on the bank and each second electrode unit is disposed on the bank.

According to still another aspect of the present disclosure, each pixel of the plurality of pixels includes a red sub pixel, a green sub pixel, and a blue sub pixel, wherein a shape of the red and green sub pixels is triangular or triangular-like, and wherein a shape of the blue sub pixel is rhombic or rhombic-like.

According to still another aspect of the present disclosure, green sub pixels of pixels that are arranged in a first row face red sub pixels of pixels that are arranged in a second row that is adjacent to the first row, wherein a first internal connection line that connects the plurality of first mesh pattern electrodes or a second internal connection line that connects the plurality of second mesh pattern electrodes and which is a straight line is disposed between the first row and the second row.

According to still another aspect of the present disclosure, the bank includes a straight-line portion that overlaps the entire first internal connection line or the entire second internal connection line.

According to still another aspect of the present disclosure, a first mesh pattern electrode surrounds the blue sub pixels of the pixels that are arranged in a first column, wherein a second mesh pattern electrode surrounds the blue sub pixels of the pixels that are arranged in a second column that is adjacent to the first column.

According to still another aspect of the present disclosure, the first internal connection line or the second internal connection line is formed along banks between a plurality of sub-pixels R, G, and B of a display panel, shapes of the sub-pixels R and G located on both sides of the first internal connection line or the second internal connection line being designed in the form of facing triangles to form the first internal connection line or the second internal connection line to be a straight line.

According to still another aspect of the present disclosure, the plurality of first mesh pattern electrodes and the plurality of second mesh pattern electrodes are alternatingly disposed in the sensing area.

According to still another aspect of the present disclosure, the sensing area is provided in a middle area of each of the plurality of touch sensors, and the first and second touch electrode units are not disposed in corner areas of each of the plurality of touch sensors.

According to still another aspect of the present disclosure, the touch screen panel further comprising: a dummy electrode extending to cover an area surrounding the sensing area in each of the plurality of touch sensors.

According to still another aspect of the present disclosure, the dummy electrode includes a first mesh pattern dummy electrode and a second mesh pattern dummy electrode, and the first mesh pattern dummy electrode and the second mesh pattern dummy electrode are coupled by a touch signal.

According to still another aspect of the present disclosure, the plurality of first mesh pattern electrodes and the plurality of second mesh pattern electrodes are alternatingly disposed in the sensing area.

According to still another aspect of the present disclosure, the sensing area is provided in a middle area of each of the plurality of touch sensors, and the first and second touch electrode units are not disposed in corner areas of each of the plurality of touch sensors.

According to still another aspect of the present disclosure, the touch screen panel further comprising: a dummy electrode extending to cover an area surrounding the sensing area in each of the plurality of touch sensors.

According to still another aspect of the present disclosure, the dummy electrode includes a first mesh pattern dummy electrode and a second mesh pattern dummy electrode, and the first mesh pattern dummy electrode and the second mesh pattern dummy electrode are coupled by a touch signal.

According to still another aspect of the present disclosure, the sensing area is provided in a middle area of each of the plurality of touch sensors, and the first and second touch electrode units are not disposed in corner areas of each of the plurality of touch sensors.

According to still another aspect of the present disclosure, the touch screen panel further comprising: a dummy electrode extending to cover an area surrounding the sensing area in each of the plurality of touch sensors.

According to still another aspect of the present disclosure, the dummy electrode includes a first mesh pattern dummy electrode and a second mesh pattern dummy electrode, and the first mesh pattern dummy electrode and the second mesh pattern dummy electrode are coupled by a touch signal.

Although the embodiments of the present disclosure have been described in detail with reference to the accompanying drawings, the present disclosure is not limited thereto and can be embodied in many different forms without departing from the technical concept of the present disclosure. Therefore, the embodiments of the present disclosure are provided for illustrative purposes only but not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A touch screen panel comprising:
    a plurality of touch sensors, wherein each of the touch sensors includes:
    a first touch electrode unit extending in a first direction;
    a second touch electrode unit extending in a second direction different from the first direction; and
    a dummy electrode including a mesh pattern and extending to cover an area surrounding the sensing area in each of the touch sensors,
    wherein the first touch electrode unit includes a plurality of first mesh pattern electrodes that are disposed to be spaced apart from each other in a sensing area where the first touch electrode unit and the second touch electrode unit intersect,
    wherein the second touch electrode unit includes a plurality of second mesh pattern electrodes that are disposed between the plurality of first mesh pattern electrodes to be spaced apart from each other in the sensing area, and
    wherein the mesh pattern of the dummy electrode has a same size and a same pattern as the plurality of first mesh pattern electrodes and the plurality of second mesh pattern electrodes.

2. The touch screen panel according to claim 1, wherein the first touch electrode unit further includes a plurality of first internal connection lines connecting the plurality of first mesh pattern electrodes, and
    wherein the second touch electrode unit further includes a plurality of second internal connection lines connecting the plurality of second mesh pattern electrodes.

3. The touch screen panel according to claim 2, wherein the plurality of first internal connection lines are disposed to be spaced apart from each other, and
    wherein the plurality of second internal connection lines are disposed in a space between the plurality of first connection lines.

4. The touch screen panel according to claim 2, wherein the plurality of first internal connection lines and the plurality of second internal connection lines are straight lines.

5. The touch screen panel according to claim 1, wherein the first mesh pattern electrodes and the second mesh pattern electrodes extend in a same direction.

6. The touch screen panel according to claim 1, wherein the first touch electrode unit further includes a plurality of first external connection lines that connect the plurality of first mesh patterns of any one touch sensor of the plurality of touch sensors to another touch sensor adjacent to the one touch sensor, and
    wherein the second touch electrode unit further includes a plurality of second external connection lines that connect the plurality of second mesh patterns of any one touch sensor of the plurality of touch sensors and another touch sensor adjacent to the one touch sensor.

7. The touch screen panel according to claim 6, wherein the plurality of second mesh patterns and the plurality of second external connection lines are disposed on different layers,
    wherein an insulating layer is provided between a layer in which the plurality of second mesh patterns are formed and a layer in which the plurality of second external connection lines are formed, and wherein the plurality of second mesh patterns are connected to the second external connection line through at least one contact hole formed in the insulating layer.

8. The touch screen panel according to claim 1, wherein a width of each of the first mesh pattern electrode and the second mesh pattern electrode is 1 μm to 5 μm.

9. The touch screen panel according to claim 1, wherein a size of the sensing area of one touch sensor among the plurality of touch sensors is 4/9 or less of a size of the entire area of the one touch sensor.

10. The touch screen panel according to claim 1, wherein the plurality of first mesh pattern electrodes and the plurality of second mesh pattern electrodes are alternatingly disposed in the sensing area.

11. The touch screen panel according to claim 1, wherein the sensing area is provided in a middle area of each of the touch sensors, and
wherein the first and second touch electrode units are not disposed in corner areas of each of the touch sensors.

12. A display device, comprising:
a display panel including a bank disposed on a substrate and a plurality of pixels defined by the bank;
a touch screen panel including a plurality of touch sensors; and
a touch driver which drives the touch screen panel,
wherein each of the touch sensors includes:
a first touch electrode unit disposed on the bank and extending in a first direction;
a second touch electrode unit disposed on the bank and extending in a second direction different from the first direction; and
a dummy electrode including a mesh pattern and extending to cover an area surrounding the sensing area in each of the touch sensors,
wherein the first touch electrode unit includes a plurality of first mesh pattern electrodes that are disposed to be spaced apart from each other in a sensing area where the first touch electrode unit and the second touch electrode unit intersect,
wherein the second touch electrode unit includes a plurality of second mesh pattern electrodes that are disposed between the plurality of first mesh pattern electrodes to be spaced apart from each other in the sensing area, and
wherein the mesh pattern of the dummy electrode has a same size and a same pattern as the plurality of first mesh pattern electrodes and the plurality of second mesh pattern electrodes.

13. The display device according to claim 12, wherein the first touch electrode unit further includes a plurality of first internal connection lines connecting the plurality of first mesh pattern electrodes disposed to be spaced apart from each other, and
wherein the second touch electrode unit further includes a plurality of second internal connection lines connecting the plurality of second mesh pattern electrodes disposed to be spaced apart from each other.

14. The display device according to claim 12, wherein the first mesh pattern electrodes and the second mesh pattern electrodes extend in a same direction.

15. The display device according to claim 12, wherein the first touch electrode unit further includes a plurality of first external connection lines that connect the plurality of first mesh patterns of any one touch sensor of the plurality of touch sensors and another touch sensor adjacent to the one touch sensor, and
wherein the second touch electrode unit further includes a plurality of second external connection lines that connect the plurality of second mesh patterns of any one touch sensor of the plurality of touch sensors and another touch sensor adjacent to the one touch sensor.

16. The display device according to claim 12, wherein a width of each of the first mesh pattern electrode and the second mesh pattern electrode is 1 μm to 5 μm.

17. The display device according to claim 12, wherein a size of the sensing area of one touch sensor among the plurality of touch sensors is 4/9 or less of a size of the entire area of the one touch sensor.

18. The display device according to claim 12, wherein the sensing area is provided in a middle area of each of the touch sensors, and
wherein the first and second touch electrode units are not disposed in corner areas of each of the touch sensors.

* * * * *